Aug. 21, 1962 J. HENRY-BAUDOT 3,050,650
ELECTRICAL WINDINGS FOR ROTARY MACHINES
Filed Jan. 21, 1960 2 Sheets-Sheet 1

Inventor:
Jacques Henry-Baudot
By Kemon, Palmer and Stewart

Aug. 21, 1962 J. HENRY-BAUDOT 3,050,650
ELECTRICAL WINDINGS FOR ROTARY MACHINES
Filed Jan. 21, 1960 2 Sheets-Sheet 2

Inventor:
Jacques Henry-Baudot
By Kenyon, Palmer and Stewart

United States Patent Office 3,050,650
Patented Aug. 21, 1962

3,050,650
ELECTRICAL WINDINGS FOR ROTARY MACHINES
Jacques Henry-Baudot, Antony, France, assignor to Printed Motors Inc., New York, N.Y.
Filed Jan. 21, 1960, Ser. No. 3,771
Claims priority, application France Feb. 5, 1959
4 Claims. (Cl. 310—268)

The present invention relates to improved electrical windings for electric rotary machines such as disclosed in my co-pending applications Serial No. 1,128 and Serial No. 760,907. In the said applications are described rotary machines, the rotor of which and the stator of which, respectively, comprises an electrical winding made of flat conductors intimately secured to the insulating faces of a carrier of sheet-like form over which they are distributed in two sets of half-turn conductors. The conductors are so shaped that a useful winding pattern is obtained when face-to-face connections are made between the ends of these half-turn conductors.

It is an object of the invention to provide improved patterns of such electrical windings that ensure a substantial reduction of ohmic losses therethrough.

It is a further object of the invention to provide improved patterns for such electrical windings which ensure a substantial reduction or cancellation of frequency harmonics.

According to a feature of the invention, instead of providing each half-turn conductor with a radial portion ended by inclined or curved extensions of such an inclination or inclinations ensuring the progression of the winding pattern with a normal pole pitch as defined in the machine by the number of poles and the number of winding conductors, the radial portions of the conductors are slanted to reduce the lengths of the inclined portions and lessen their inclinations to reduce the mean pitch of the winding with respect to the normal pole pitch in the machine. Such a reduction of pitch may reach one-third of the normal value, as known in conventional machines.

The invention will be fully explained with reference to the accompanying drawings, wherein:

FIG. 1 shows an elevation and partial cross-section view of an embodiment of a machine including the present invention and wherein the winding is part of the rotor;

FIG. 2 shown an elevation and partial cross-section view of an embodiment of a machine which includes the invention and wherein the winding is part of the stator;

Figure 1:
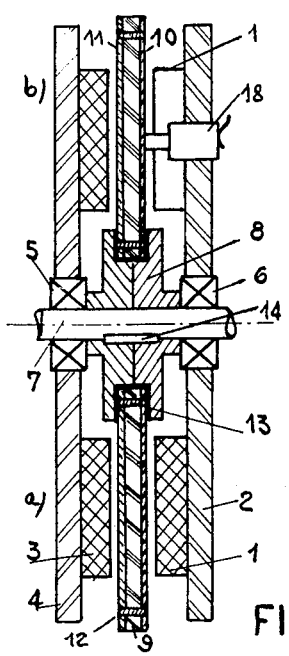

The machine referred to in FIG. 1 comprises a stator member consisting of magnets such as 1 fixed on a supporting plate 2 and forming an annular ring comprising as many magnets as magnetic poles required in the machine, said poles regularly alternating in north and south polarities around the said stator ring. Portion (*a*) of FIG. 1 is a cross-section through one magnet and portion (*b*) is a cross-section passing between magnets and showing one of the brushes 18 of the machine.

A shaft 7 is supported by bearings 6 and 5 mounted on plates 2 and 4 respectively. Plate 4 carries on its inside a ring-shaped magnetic yoke 3 which is free from eddy currents either by the magnetic material of this yoke being a ferrite or forming it of a spiralled magnetic tape wound on its edge. A hub 8 carries the armature and is keyed at 14 on the shaft 7. The armature comprises a thin insulating disk 9 coated on both faces by flat conductor sets of half-turns 10 and 11. Bridging connections such as 12 and 13 are for instance led through the insulator for making the face-to-face connections between the said half-turn conductors.

Figure 2:
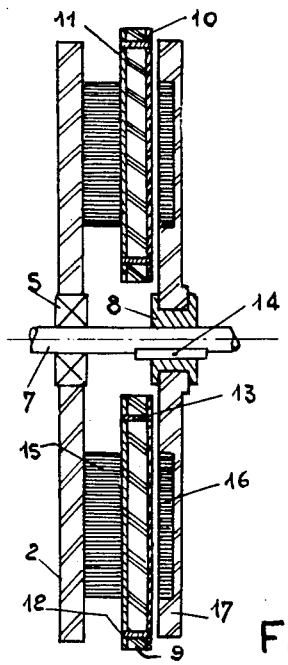

The machine referred to in FIG. 2 comprises a stator winding of same structure as that in FIG. 1 for the armature thereof, but in FIG. 2, it must be considered that this winding is provided with fixed terminals instead of brushes, as it is an inductor member in the machine, which is for instance an A.C. asynchronous motor. The armature of this motor comprises a squirrel-cage developed as an annular ring. It comprises for instance such radial conductors as 16 arranged within a supporting cup 17, said radial conductors being connected at their inner and outer ends by conductor rings not shown on the drawing. The stator winding is applied over a magnetic ring 15 free from eddy currents and this ring is affixed to a plate 2.

Figure 3:
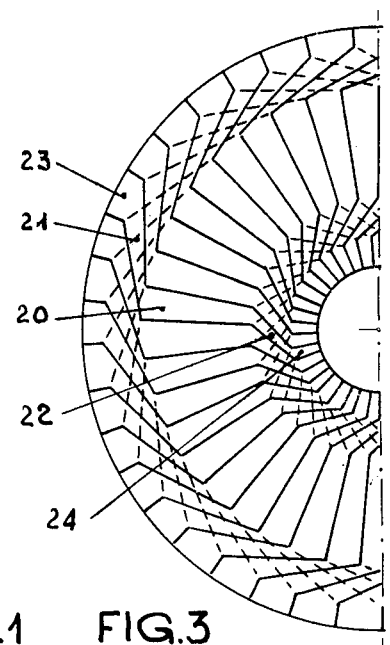
FIG. 3 shows a half-view of a face of a winding of the series-wave pattern and disclosed in my previous co-pending applications.
Figure 4:
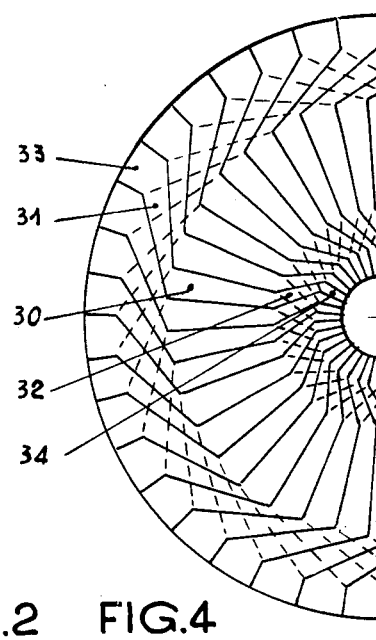
FIG. 4 shows a half-view of a face of a winding similar to that of FIG. 3 but of a lap-type pattern.

Structures of flat conductor windings are shown in FIGS. 3 and 4 as provided by application in the above-referred applications. FIG. 3 relates for the sake of illustration to a 41 turn series-wave winding in a four pole machine. Each half-turn comprises a radial sectoral portion 20 extending at both ends in inclined (or curved if required) portions 21 and 22. Said portions respectively end in flat terminals as shown at 23 and 24. FIG. 4 relates to a 40 turn lap winding in a four pole machine. Each half-turn conductor comprises a radial and sectoral portion 30 extending at both ends in inclined (or curved as the case may be) portions 31 and 32, respectively ending in flat terminals 33 and 34.

In both members, the designs of the two faces of the winding are similar but the orientation of the inclined portion of the half-turns are reversed from one face to the other, so that from this reversal of orientation, together with the degree of inclination and the lengths of these portions, each winding presents a required pole pitch, which is the normal and plain pole pitch otherwise defined by the structure of the machine.

With respect to conventional windings, it may be stated that the inclined portions are what are called end portion conductors, viz. they are actually useless in creating torque in the machine. On the other hand, they increase the ohmic losses of the winding, that is to say, the consumption of ohmic loss without usefulness for the operation of the machine. It is consequently highly desirable that these end portion conductors may be as much reduced in length as possible, the efficiency of the winding will of course be increased if one considers the diameter unchanged. If this diameter is changed, it will be in the direction of a reduced diameter which is also interesting.

From another point of view, the sectoral shape of the active portions of half-turn conductors on the faces of the winding ensures that the winding coverage ratio remains the same throughout the structure but as a counterpart, this may have a tendency to enhance harmonics at the rotation frequency of the machine. The reduction of harmonics may be obtained, in conventional machines, by shortening the pitch of winding with respect to the normal pitch. However, in such conventional machines, this leads to a reduction of efficiency as it lowers the number of conductors in the winding. In contradistinction thereto, in flat conductor machines according to the invention, a reduction of pitch will have its full beneficial effect without such objections provided the number of conductors remains the same in the winding.

Figure 5:
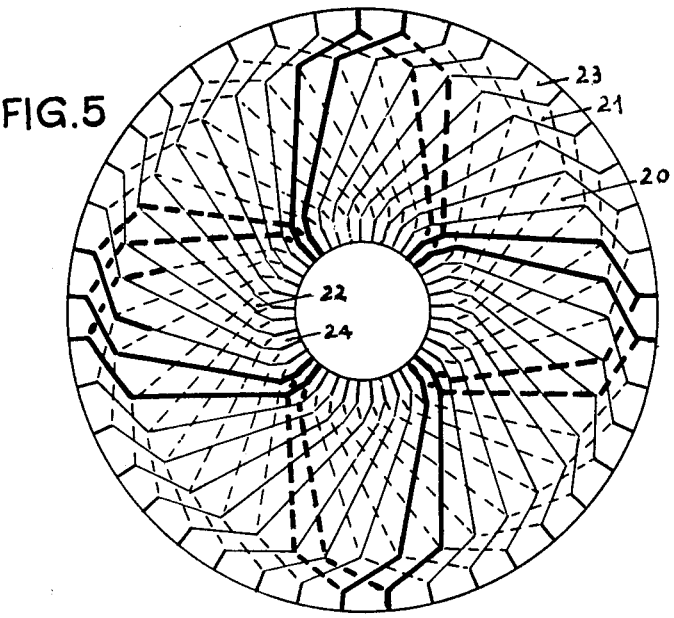
FIG. 5 shows a half-view of a series wave winding as shown in FIG. 3 but modified by the practice of the present invention; and, FIGS. 6 and 7 respectively show two examples of lap windings as shown in FIG. 4 but modified by the practice of the present invention.

All these beneficial effects are obtained when, according to the invention, in a winding of the kinds disclosed with reference to either FIG. 3 or to FIG. 4, as one considers a series-wave or a lap winding pattern, by first slanting the portions of the half-turn conductors which in these FIGS. 3 and 4 were radial, and simultaneously shortening the end portions of these half-turns. This results in a shortening or reduction of the pitch of the winding, decreases the lengths of the end portions of the half-turns, consequently decreasing the ohmic losses in the winding and consequently further reduces the undesirable harmonics. Such effects would obviously not be obtained by merely inclining the active portions of the conductors, the slanting must be so made that the pitch is simultaneously reduced. A comparison between FIG. 5 which shows a winding of reduced step according to the invention with the winding of FIG. 3, clearly demonstrates the difference between the pitches: numbering in FIG. 3 the conductors of one face as 1, 3, 5, 7, 11 . . . and numbering the conductors on the opposite face 2, 4, 6, 8, 10, 12 . . . starting from any conductor and with 2 being (opposite to) 3, starting from conductor 1 the winding pattern reaches conductor 12 on the other face of the disk. Making the same numbering on the winding shown in FIG. 5, starting from the conductor number 1, the winding reaches the conductor 8 on the other face. The pitch at the outer periphery of the winding has thus been reduced by one-third.

Figure 6:
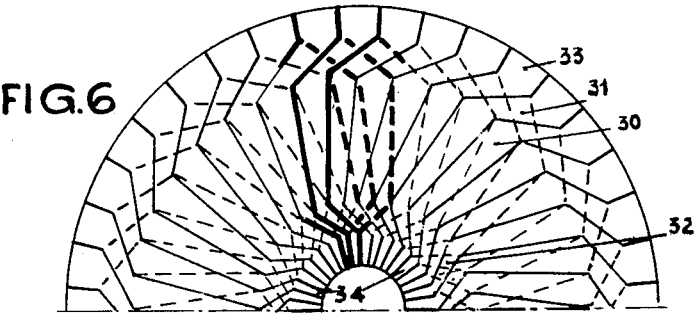
Figure 7:
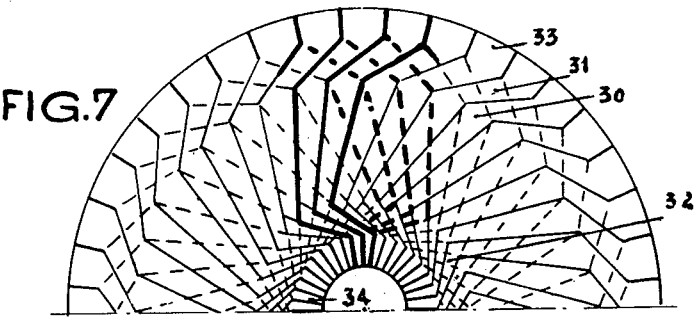

FIGS. 6 and 7 respectively show two examples of lap pattern windings provided according to the invention and derived from the pattern of FIG. 4. The shortening of pitch is less in FIG. 6 than in FIG. 7 where it reaches the one-third degree which is considered as the optimum in conventional technique.

It must be noticed that, in FIG. 1 where the winding cooperates with brushes, these brushes are placed over active portions of the conductors. With windings according to the present invention, this will not have any deleterious effect on commutation since all parts of conductors are slanted

I claim:

1. In a rotary electrical machine a member of which includes a winding made of flat conductor half-turns intimately secured to insulated faces of a sheet-like carrier, said half-turns being distributed over two opposite surfaces of said carrier and shaped for giving an effective winding pattern by face-to-face connections of their ends, the provision of any and all half-turn conductor as formed by an active slanted portion extended on both sides by inclined end portions with a slant reducing the actual mean winding pitch to a value which lies between the normal pole pitch and two-thirds of the said normal pitch in the machine.

2. Arrangement according to claim 1, wherein the winding is formed over a disk-shaped carrier and the pattern is of the series-wave kind of winding.

3. Arrangement according to claim 1 and wherein the winding is formed over a disk-shaped carrier and the pattern is of the lap kind of winding.

4. Arrangement according to claim 1 wherein the lengths of the inclined portions are reduced according to the slanting at the active portions.

No references cited.